Feb. 17, 1970  R. A. DEIBEL  3,495,290
PIVOT SHAFT ASSEMBLY

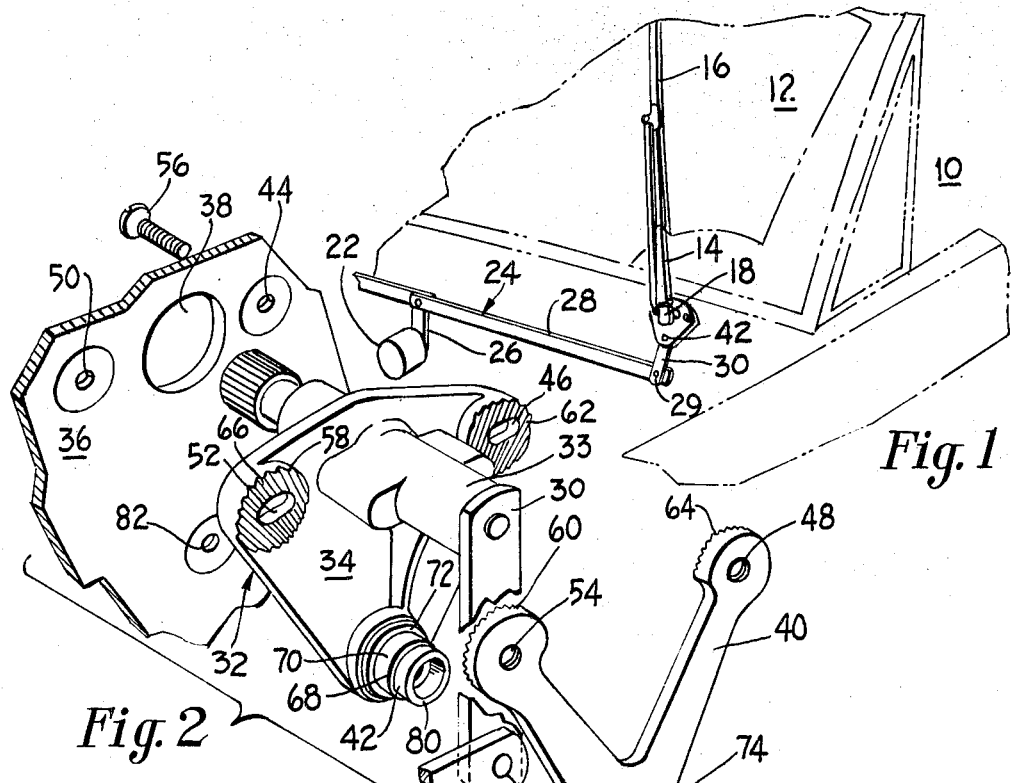
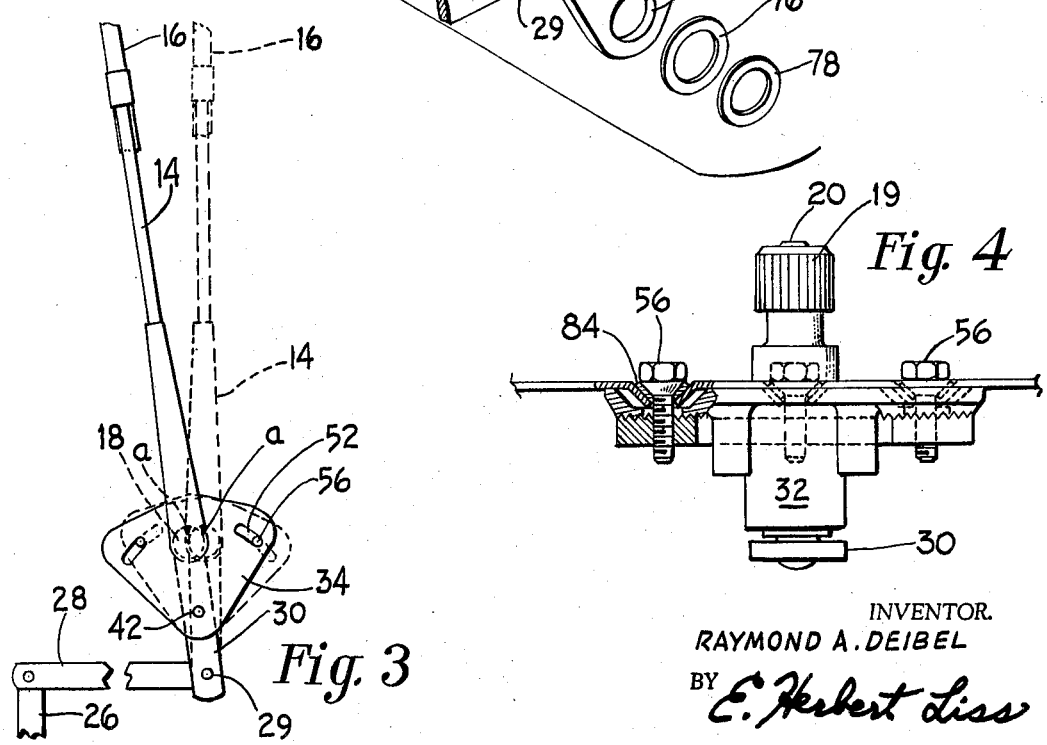

Filed Jan. 8, 1968  2 Sheets-Sheet 2

INVENTOR.
RAYMOND A. DEIBEL
BY
E. Herbert Liss
ATTORNEY.

United States Patent Office 3,495,290
Patented Feb. 17, 1970

3,495,290
PIVOT SHAFT ASSEMBLY
Raymond A. Deibel, Cheektowaga, N.Y., assignor to
Trico Products Corporation, Buffalo, N.Y.
Filed Jan. 8, 1968, Ser. No. 696,231
Int. Cl. B60s 1/16
U.S. Cl. 15—250.13                                     9 Claims

ABSTRACT OF THE DISCLOSURE

A windshield wiper linkage transmission train for converting the rotary output of a motor to oscillatory motion at a wiper arm and blade assembly, includes a motor crank arm, a drive lever, a pivot shaft crank arm, a wiper arm pivot shaft and a pivot shaft bearing housing and bracket assembly being mounted for adjustment in a limited path to provide accurate positioning of the wiper arm and adjustment of the wiping pattern. The attaching bracket is clamped between the cowl of the vehicle and a base member secured in fixed position relative to the body metal, enlarged bolt openings on the attaching bracket are positioned to permit limited movement relative to the body and the base member; serrations on the attaching bracket intermesh with serrations on the base member to serve as detents and to maintain the pivot shaft bearing housing in adjusted position. In one embodiment illustrated the bracket is pivotal about a fixed axis; the serrations extend in a radial direction with respect to the fixed axis. In a second embodiment the bracket is displaced horizontally. Displacement of the bearing housing and bracket assembly in both embodiments results in angular adjustment of the arm.

BACKGROUND OF THE INVENTION

The present invention relates to a pivot shaft assembly for windshield wipers in motor vehicles and, more particularly, to an adjustable pivot shaft bearing housing and bracket.

In a windshield wiper transmission linkage system, the pivot shaft bearing housing is usually fixed on a body portion of the vehicle adjacent the lower molding of the windshield in the cowl area. The specific location is determined by the shape of the windshield, the geometry of the transmission linkage and the aesthetic design of the vehicle body. The bearing housing and pivot shaft journaled therein extend outwardly of the vehicle. The wiper arm is mounted on a drive burr secured to the pivot shaft; it has a plurality of axially extending serrations for firmly positioning the wiper arm.

To avoid obstruction of the driver's view, the wiper arms must be positioned adjacent the upper edge of the lower molding of the windshield or, in the case of concealed windshield wipers, below the upper edge of the lower molding of the windshield when parked. Good design and manufacturing technique require that the serrations on a drive burr of suitable diameter be separated by approximately four degrees. Thus, the wiper arm can be out of position by as much as four degrees from the desired parking position. Because the wiper blade is attached to the outer end of the arm, a four degree error in positioning of the wiper arm would place the wiper blade in a driver distracting position on the windshield. Much finer adjustment is required, not only to properly position the blades, but also to prevent interference between blades of the overlapping-wipe type while permitting close parking of the blades.

Various means for providing either infinite or very fine adjustment of the position of the wiper arm have been devised, including clutched pivot shaft connections for infinite adjustment and elongated drive burrs. In these prior art devices, the pivot shaft connection was either poor, permitting slippage of the arm relative to the drive burr or resulted in complex arm to pivot shaft connections or were not readily accessible.

SUMMARY

This invention provides for adjustably positioning the pivot shaft and pivot shaft bearing assembly, thereby resulting in an extremely fine adjustment of the arm position. A pivot shaft bearing housing and bracket assembly is provided which includes a bearing housing having a radially extending attaching bracket integral therewith, as shown, or rigidly secured thereto in any suitable manner and a base member for clamping the attaching bracket to the vehicle body. The attaching bracket is clamped between the base and a vehicle body portion below the surface of the cowl by means of screws, bolts, or other suitable releasable clamping means extending through aligned openings in the body metal, the base and the bracket. Serrations are provided on opposing surfaces of the base and the bracket adjacent the aligned openings. The aligned openings in the base may be threaded to receive the screws or bolts and to retain the base in a fixed position relative to the body portion. The aligned openings in the bracket are enlarged to permit displacement of the bracket and bearing housing relative to the base and body portion when clamping pressure is relieved. The opposing serrations on the base of the bracket serve as adjustment detents when the clamping pressure is relieved and serve to firmly retain the assembly in position when the screws or bolts are tightened to provide firm clamping action.

Thus, the wiper arm can be positioned on a drive burr within four degrees of a desired position. The opposed serrations may permit further arm position adjustment of as little as one degree or less. The enlarged openings in the bracket need only permit a maximum of four degrees of arm position adjustment in steps of one or less degrees.

The principal object of the present invention is to provide an improved arm position adjusting device utilizing an adjustable pivot bearing housing for fine adjustment.

Other objects and advantages of the invention will be apparent from the following detailed description taken in connection with the accompanying drawings.

BRIEF DESCRIPTION OF THE DRAWINGS

FIG. 1 is a partial perspective view of a motor vehicle incorporating the adjustable pivot shaft assembly.

FIG. 2 is an exploded perspective view of the pivot shaft assembly.

FIG. 3 is a diagrammatic view of a transmission linkage incorporating the adjustable pivot shaft assembly of this invention showing the wiper arm in the extreme position of adjustment.

FIG. 4 is a side elevational view of the pivot shaft assembly of this invention partly in cross section.

DESCRIPTION OF THE PREFERRED EMBODIMENTS

Figure 5:
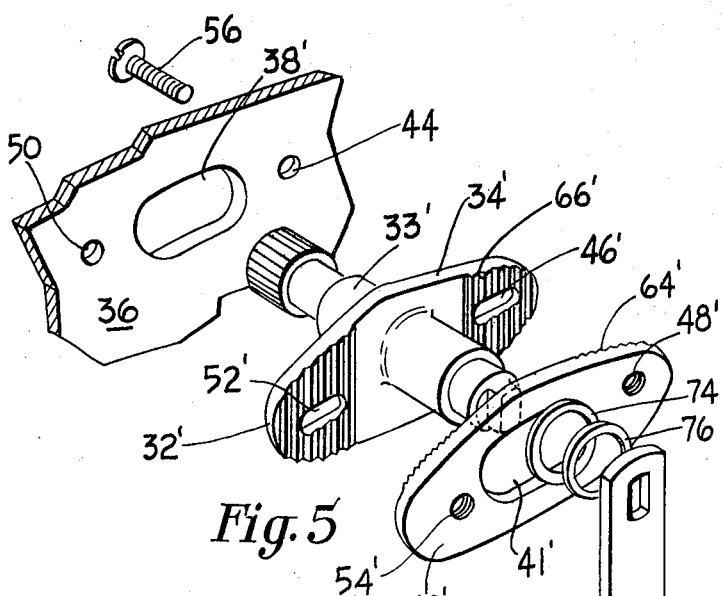
FIG. 5 is an exploded perspective view illustrating another embodiment of the invention.

In FIG. 1 there is shown a motor vehicle 10 having a windshield 12 provided with a wiper arm 14 having mounted on the free end thereof a wiper blade 16. The wiper arm 14 includes a mounting head 18 having internal serrations (not shown) for securement to serrated drive burr 19 on a pivot shaft 20. A motor 22 of any suitable type is provided and may be mounted on the fire wall of a vehicle in any suitable manner for driving the wiper arm 14. Transmission linkage train 24 is provided for converting the output of the wiper motor 22 to oscillatory motion of the pivot shaft 20. The transmission linkage train includes a motor crank shaft 26, a drive lever 28 and a pivot shaft crank arm 30 pivotally secured together. Although a specific linkage arrangement is shown and described for the purpose of illustration, it will of course be understood that other and different types of transmission linkages may be employed in accordance with the broader aspects of this invention. The pivot shaft crank arm 30 is secured to one end of pivot shaft 20. The pivot shaft 20 is journaled in a sleeve bearing (not shown) secured in bearing housing 33 of pivot shaft bearing bracket assembly 32.

The bearing bracket assembly 32 includes a bearing housing 33 and a radially extending attaching bracket 34, which may integral therewith or rigidly secured thereof in any suitable manner, for securing the bearing housing to the body portion 36 at the cowl of the vehicle 10. One end of the pivot shaft bearing housing 33 extends through an opening 38 in the body portion 36. There is sufficient clearance in the opening 38 to permit movement of the projecting end of the pivot shaft bearing housing 33. The pivot shaft bearing bracket assembly 32 also includes a base 40 pivotally connected at 42 to the attaching bracket 34. The body portion 36, attaching bracket 34 and base 40 have a first set of aligned openings 44, 46 and 48, respectively, and a second set of aligned openings 50, 52 and 54, respectively. The openings 48 and 54 of the base 40 are perferably threaded to receive screws or bolts 56 which extend through openings 44, 46 and 48 and also through openings 50, 52 and 54.

The attaching bracket 34 is thus clamped between the body portion 36 and the base 40. The openings 46 and 52 of the bracket 34 are elongated in a direction to permit limited arcuate movement of the bracket 34 relative to the base 40 and the body portion 36 about pivotal axis 42. On the opposed surfaces of the bracket 34 and the base 40 there are embossments 58 and 60, 62 and 64, securing the openings 52 and 54 and openings 46 and 48. Each of these embossments is provided with radially directed serrations radiating from the pivotal axis 42. When the screws or bolts 56, constituting clamping means, are tightened, the serrations 66 firmly engage each other to securely clamp the bracket 34 intermediate the base 40 and the body portion 36. The clamping means 56 also retain the base 40 fixed against movement relative to the body portion 36. When the clamping means 56 are loosened, the opposed serrations 66 on the base 40 and bracket 34 act as detent means to permit fine adjustment of the bracket and bearing housing 34 in an arcuate path about pivotal axis 42.

The pivotal axis 42 is formed by an apertured cylindrical boss 68 having a reduced diameter portion 70 forming a shoulder 72. The reduced diameter portion 70 is journaled in opening 74 of base 40, the shoulder 72 forming a spacer and bearing surface to permit free relative movement between base 40 and bracket 34. A tension washer 76 backed by a washer 78 may be provided an the free end of boss 68 to bias the base 40 against the attaching bracket 34 thereby providing positive intermeshing of the opposed serrations. The free end 80 of the boss may be peened over the washers 76 and 78 to retain the base 40 and pivot bracket and housing 34 in assembled condition. An opening 82 is provided in the body portion 36 in aligment with the aperture in embossment 68. The apertured embossment 68 may be threaded to received a screw (not shown) extending through opening 82 for additional stability of the assembly. Dished washers 84 are provided in the outer surface of apertures 50 and 44. Washers 84 may constitute an element of the clamping means together with screws or bolts 56.

In operation the bearing bracket assembly 32 is secured to the body portion 36 with the bearing housing 33 positioned intermediate the end position of its arcuate path, as shown in FIG. 3, thereby permitting adjustment in either direction. The mounting head 18 of the wiper arm 14 is then positioned on the drive burr 19 as closely as possible to the correct positioning. The clamping engagement between the attaching bracket 34 and the base 40 is then relieved by loosening of the clamping means or screws 56. When the wiper motor is off, the position of the motor crank arm 26 and the drive lever 28 and the pivot point between them is fixed so that the only movable parts are the pivot shaft bearing housing and bracket assembly, 33, 34, the wipe arm 14 and the pivot shaft crank arm 30. The wiper arm 14 and pivot shaft crank arm 30 are movable as a unit forming a second class lever fulcrumed at the pivot axis 29 between the crank arm 30 and the drive lever 28, the bearing housing and bracket assembly 33, 34 acting as the load. Thus, the wiper arm serves as an adjusting lever and provides a substantial lever arm achieving a large mechanical advantage. It can be grasped to move the bracket 34 together with the bearing housing 33 and crank arm 30 about axis 42 to either the extreme position shown in full line in FIG. 3 or the extreme position shown in dotted line or to detent points therebetween. Thus, the arm can be moved to the desired position on the windshield. Clamping means 56 may then be tightened to retain the arm and pivot shaft in the proper adjusted position. Observation of the indicator mark "a" on the drive burr 19 shown in FIG. 3 will illustrate the relative angular displacement of the drive burr upon adjustment of the pivot shaft assembly. It is this relative angular displacement of the drive burr which provides the fine adjustment feature.

Figure 6:
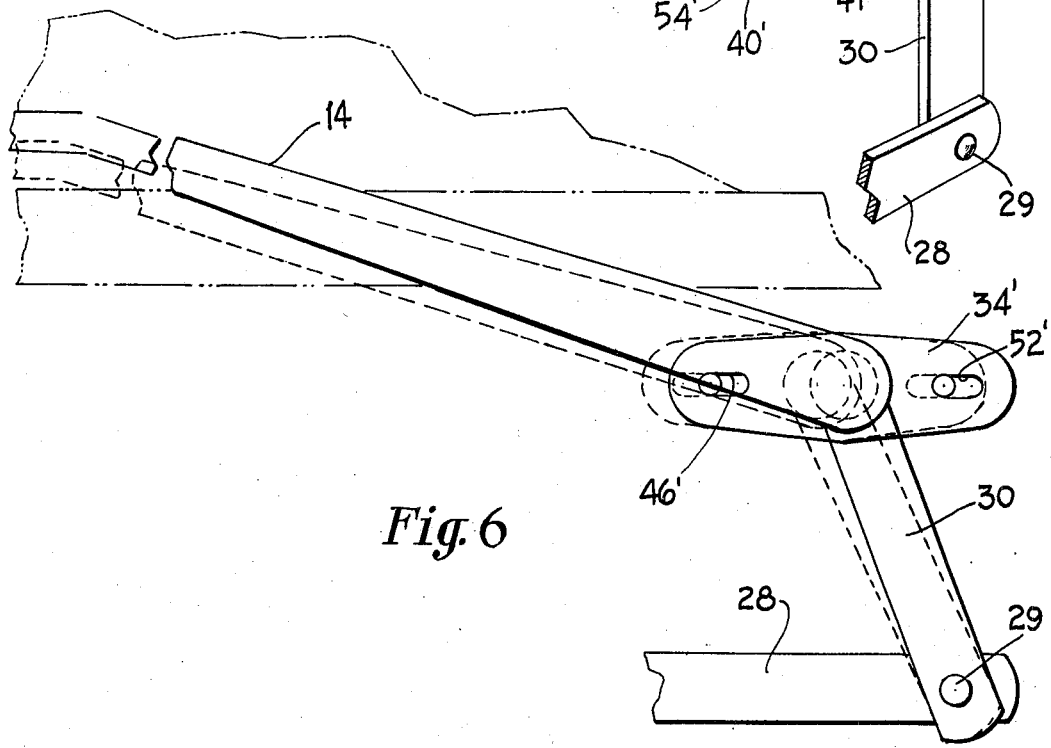
FIG. 6 is a diagrammatic view of the embodiment shown in FIG. 5 similar to FIG. 3 illustrating the extreme positions of adjustment.

Another embodiment of the invention is illustrated in FIGS. 5 and 6. Like reference numerals will be used for identical corresponding parts in the FIG. 2 embodiment. Corresponding parts will be marked with primed reference numerals. In this example, the pivot shaft assembly 32' includes a pivot shaft bearing housing 33' and pivot shaft bracket 34' having a pair of elongated, enlarged openings 46' and 52'. The body portion 36 includes an elongated, enlarged opening 38' for reception of the pivot shaft 20 and the outer portion of the pivot shaft bearing housing 33'. A base 40' is provided for clamping the bearing bracket 34' against the body portion 36. Base 40' is provided with an elongated, enlarged central opening 41' for slidable reception of the inner end of the pivot bearing housing 33'. Tension washer 74 and back-up washer 76 serve to bias base 40' against attaching bracket 34'. The body portion 36 includes openings 44 and 50 for reception of screws or bolts 56. Base 40' includes threaded openings 48' and 54'. The openings 44', 46' and 58' and the openings 50', 52 and 54' are in alignment, respectively. Bolts or screws 56 are received therethrough and threadably received in openings 48' and 54' to maintain the base 40' in fixed relationship with the body portion 36. Disposed about opposed surfaces on bracket 34' and base 40' are serrations 66' and 64', respectively, which serve as detents when the clamping means or bolts 56 are loosened and which maintain the bracket in adjusted position when the clamping means 56 are tightened. As can be seen in FIG. 6, adjustment is achieved by moving the bearing housing 33' and bracket 34' horizontally in one direction or the other. This results in angular adjustment for a wiper arm 14 and produces fine adjustment adjacent the lower molding.

It should now be apparent that a unique pivot shaft assembly for windshield wiper linkage has been provided which will provide fine adjustment for properly positioning a windshield wiper arm. Certain specific embodiments of the invention have been shown and described for the purpose of illustration, but it will be apparent that various modifications and other embodiments are possible within the scope of the invention. It is to be understood, therefore, that the invention is not limited to the specific arrangement shown, but in its broadest aspects it includes all equivalent embodiments and modifications which come within the scope of the invention.

What is claimed is:

1. An adjustable windshield wiper pivot shaft bearing bracket assembly for motor vehicles comprising a base member, a bearing housing for journaling a pivot shaft and an attaching bracket rigidly secured to said bearing housing, said attaching bracket being pivotally secured to said base member about a fixed axis and clamping means for securing said bracket assembly to a body portion of a motor vehicle with said base member in fixed position, said attaching bracket being releasably clamped intermediate said body portion and said base member for pivotal movement about said fixed axis when said clamping means is released.

2. An adjustable windshield wiper pivot shaft bearing bracket assembly for motor vehicles comprising a bearing housing for journaling a pivot shaft having a radially extending attaching bracket and a base member, means for mounting said bracket for pivotal movement relative to said base member and releasable clamping means for securing said pivot shaft bracket assembly to a body portion of a vehicle and also for restraining said base member and said radially extending bracket against relative pivotal movement.

3. In a windshield wiper pivot shaft assembly for motor vehicles, a pivot shaft bearing housing and bracket assembly comprising a bearing housing having a radially extending attaching bracket secured thereto for securing said housing to a body portion of a vehicle and a base member, connecting means for mounting said attaching bracket for pivotal movement relative to said base member, a plurality of aligned openings on said bracket and said base member, releasable clamping means extending through said aligned openings for securing said housing and bracket assembly to a body portion of a vehicle, the openings on said bracket being enlarged relative to the openings on said base member to permit limited movement of said bracket relative to said base member in an arcuate path and means for resisting pivotal movement of said attaching bracket relative to said base.

4. The combination according to claim 3 wherein said means for resisting pivotal movement comprises intermeshing serrations extending radially from said connecting means on opposed surfaces of said bracket and said base member at said aligned openings.

5. The combination according to claim 3 wherein said releasable clamping means retains said bracket between said base member and the body portion of the vehicle, the base member being in fixed position relative to the body metal of the vehicle.

6. An adjustable windshield wiper pivot shaft bearing bracket assembly for motor vehicles comprising a bearing housing for journaling a pivot shaft having a radially extending attaching bracket and a base member, means for mounting said bracket for movement relative to said base member and releasable clamping means for securing said pivot shaft bracket assembly to a body portion of a vehicle and also for restraining said base member and said radially extending bracket against movement relative to each other.

7. The combination according to claim 6 wherein said bracket is movable laterally relative to said base member when said releasable clamping means is in a released condition.

8. The combination according to claim 6 where in said clamping means includes face to face engaging means on said bracket and said base member for restraining relative movement between said bracket and said base member.

9. The combination according to claim 8 wherein said face to face engaging means comprises a serrated surface.

References Cited

UNITED STATES PATENTS

| | | | |
|---|---|---|---|
| 2,608,707 | 9/1952 | Oishei | 15—250.13 |
| 2,753,734 | 7/1956 | Deibel | 15—250.13 X |
| 2,834,979 | 5/1958 | Roth | 15—250.13 |
| 3,045,272 | 7/1962 | Oishei | 15—250.13 |

ROBERT W. JENKINS, Primary Examiner